United States Patent [19]
Farnsworth et al.

[11] Patent Number: 5,133,248
[45] Date of Patent: Jul. 28, 1992

[54] COMBINED BROILER AND GRIDDLE UNIT

[75] Inventors: Craig A. Farnsworth, Chagrin Falls; Steven R. Walzer, Brunswick, both of Ohio

[73] Assignee: Gas Research Institute, Chicago, Ill.

[21] Appl. No.: 363,593

[22] Filed: May 19, 1989

[51] Int. Cl.⁵ .............................................. A47J 37/00
[52] U.S. Cl. .................................. 99/337; 99/339; 99/385; 99/422; 126/39 BA; 126/41 R; 126/42
[58] Field of Search ................ 99/331, 337, 372, 378, 99/385, 389, 390, 401, 422, 423, 339, 325, 338, DIG. 14; 126/41 R X, 39 BA, 42

[56] References Cited

U.S. PATENT DOCUMENTS

| | | | |
|---|---|---|---|
| 1,502,447 | 7/1924 | Shroyer | 126/41 R |
| 2,070,111 | 2/1937 | Blayney | 126/41 R |
| 2,180,061 | 11/1939 | Lagrange | 99/378 |
| 2,188,757 | 1/1940 | Moon | 99/422 |
| 2,513,051 | 6/1950 | Ray | 126/42 |
| 2,668,527 | 2/1954 | Chambers | 126/41 R |
| 2,765,727 | 10/1956 | Lipsich et al. | 99/331 |
| 2,811,628 | 10/1957 | Gottfried | 126/411 R |
| 2,848,990 | 8/1958 | Haedike et al. | 126/41 R |
| 3,511,223 | 5/1970 | Welshofer et al. | 126/41 R |
| 3,514,301 | 5/1970 | Berger | 99/390 |
| 3,870,031 | 3/1975 | Kruper | 126/41 R |
| 4,027,139 | 5/1977 | Theimer | 99/422 |
| 4,586,428 | 5/1986 | Adamson | 99/378 |
| 4,587,948 | 5/1986 | Haglund | 126/41 R |
| 4,671,250 | 6/1987 | Hurley et al. | 99/447 |
| 4,878,424 | 11/1989 | Adamsson | 99/331 |
| 4,913,047 | 4/1990 | Burley | 99/337 |

FOREIGN PATENT DOCUMENTS 409348  4/1934  United Kingdom ................ 99/378

Primary Examiner—Philip R. Coe
Assistant Examiner—Mark Spisich
Attorney, Agent, or Firm—Mason, Fenwick & Lawrence

[57] ABSTRACT

Gas-fired cooking apparatus comprising a combined griddle and broiler unit, including a hinged broiler heat source which can be selectively raised or lowered over the cooking surface of the griddle is disclosed. The heat source is ignited by an electro-mechanical system responsive to the position of the broiler top, and which ignites the heat source only when the top is lowered. An exhaust system is provided for removing combustion products from the cooking surface.

9 Claims, 3 Drawing Sheets

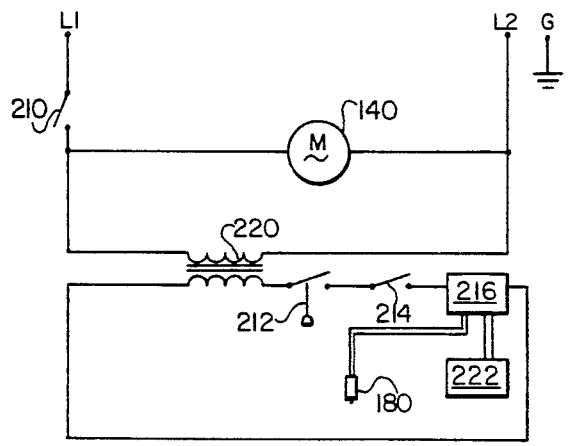
FIG. 6
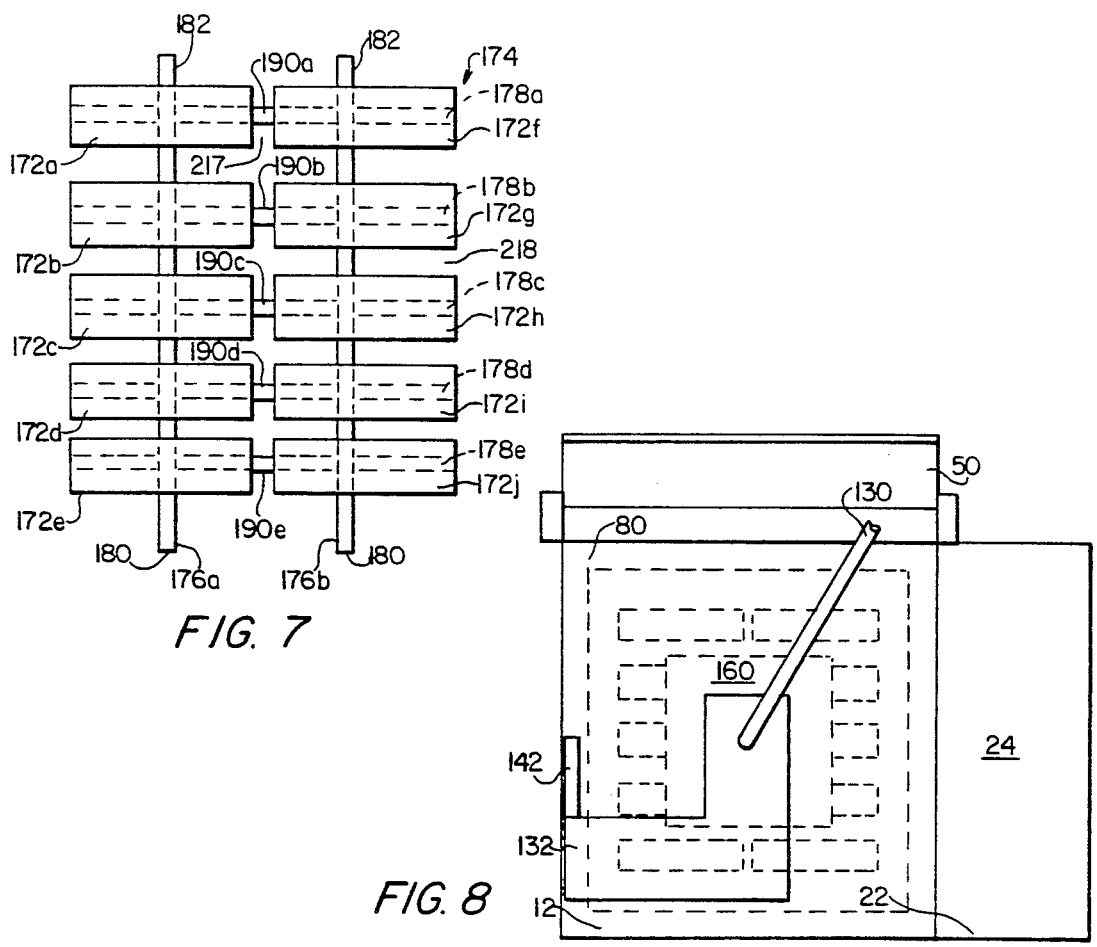
FIG. 7
FIG. 8

COMBINED BROILER AND GRIDDLE UNIT

BACKGROUND OF THE INVENTION

The present invention generally relates to cooking apparatus for cooking food using direct or reflected heat, especially stoves, ranges and the like. The present invention specifically relates to combination broiler/-griddles having movable broiler heat sources.

FIELD OF THE INVENTION

A griddle is used to cook food by direct contact with a metal plate maintained at an elevated temperature (e.g., 300° F. to 375° F.) by applying heat to the interior or bottom side of the plate. A broiler is used to cook food by exposing food to an overhead burner or surface maintained at a high temperature, e.g., 1200° F. Food cooked by broiling does not directly contact the heat source. Currently, these means of cooking are incorporated in devices which do not permit applying heat to the same planar surface.

The high temperature heat used in broiling presents several safety problems. Persons operating the broiler must be shielded from the heat source, and smoke produced during cooking must be exhausted. In the prior art, these problems have been solved by enclosing the broiler heat source in an insulated chamber provided with an exhaust system; this configuration is used in conventional ovens and ranges. However, such devices do not readily allow the operator to observe food as it is cooked, and hence cause great risk of overcooking or burning the food.

Furthermore, devices in the prior art do not permit the cook to swiftly and easily begin cooking on the griddle after broiling is complete. A second, separate griddle must be used, which consumes additional amounts of energy and kitchen space.

Attempts to combine broilers and griddles to circumvent these disadvantages have not solved all the problems presented above. For example, U.S. Pat. No. 2,664,490 (Allgeyer) teaches the use of a combination broiler/griddle. However, the broiler is made inoperable by the placement of the griddle upon the broiler heating elements Similarly, U.S. Pat. No. 3,514,301 (Berger) illustrates a range having broiler means only. The cooking surface illustrated in the Berger patent may not be used as a griddle. The same disadvantages are shared by U.S. Pat. No. 3,547,097 (Rice).

No combination cooking units in the prior art are gas-fired. Persons having culinary expertise may prefer gas-fired cooking apparatus, because the temperature of the heat source is more easily controlled by the cook, and the cost of operation is substantially lower.

Therefore, many cooks would find it desirable to have a cooking apparatus capable of both broiling and frying on a griddle at the same time.

SUMMARY OF THE PRESENT INVENTION

Accordingly, it is one object of the present invention to provide a combination broiler and griddle having a system for rapidly removing the high heat source used in broiling from the food, while simultaneously permitting the convenient reapplication of heat according to the desire of the cook.

It is another object of the present invention to provide a combination cooking apparatus consisting of a griddle and broiler in a compact unit to facilitate efficient use of space in a kitchen.

It is a further object of the present invention to provide a combination cooking apparatus having a single cooking surface to facilitate efficient cleaning of the apparatus after use.

The foregoing objects of the invention, and other objects, are achieved through a combination cooking apparatus comprising a griddle including a substantially planar sheet having a top cooking surface for receiving food and a bottom heating surface, a housing for the griddle, a broiler movably mounted to the housing, a gas burner positioned within the broiler for broiling food when the broiler is moved in close proximity with the cooking surface, heating means positioned within the griddle for directly heating the bottom cooking surface, and control means for activating the gas burner when the broiler is moved in close proximity with the cooking surface and for deactivating the gas burner when the broiler is moved away from the cooking surface.

In one embodiment of the invention, the broiler top is hingedly mounted to a floor-standing unit which includes a griddle. The gas flame broiler ignites under electromechanical control when the broiler top is lowered over the griddle. Conversely, when the broiler top is raised above the griddle, the control system extinguishes the broiler flame. The griddle heat source remains activated when the broiler top is down, permitting simultaneous griddle cooking and broiling on one integrated, floor-standing unit.

BRIEF DESCRIPTION OF THE DRAWINGS

FIG. 6 is a schematic diagram of the electrical and electro-mechanical equipment used to operate the apparatus of FIG. 1.

FIG. 7 is a top plan view of the heat distribution assembly mounted within the broiler top.

FIG. 8 is a top plan view of a second embodiment of the invention having an extended griddle surface below the broiler top.

DETAILED DESCRIPTION OF THE PREFERRED EMBODIMENTS

Figure 1:
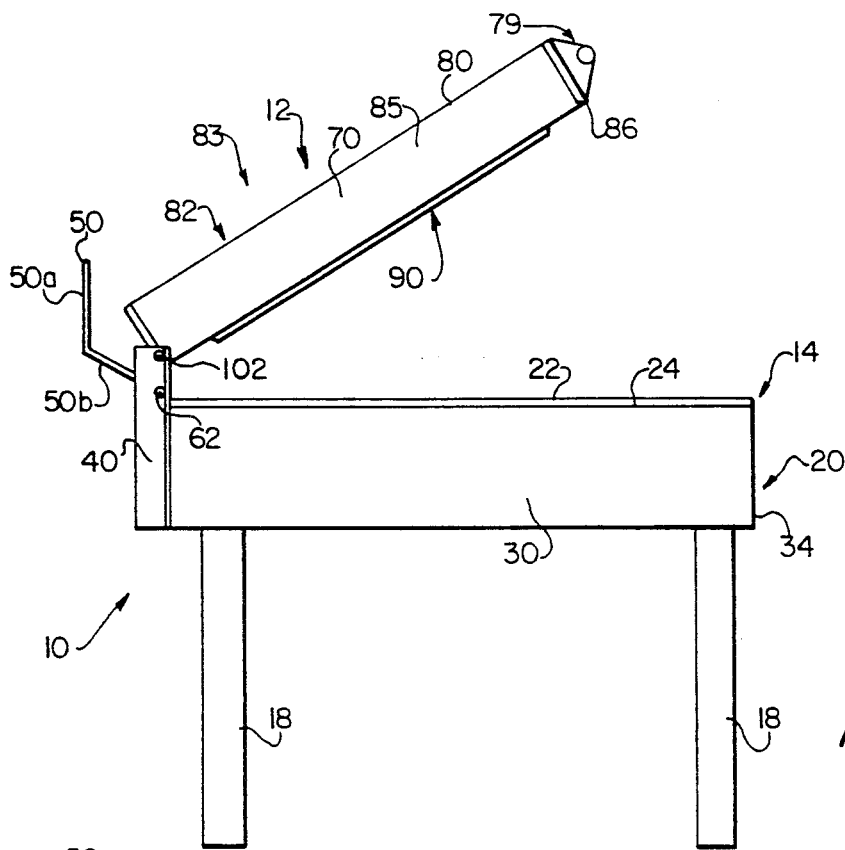
FIG. 1 is a side elevational view of the combination griddle with broiler top, depicting the brioler top in raised position.

In describing the preferred embodiments of the subject invention illustrated in the drawings, specific terminology will be used for the sake of clarity. However, the invention is not intended to be limited to the specific terms so selected, and each specific term includes all technical equivalents which operate in a similar manner to accomplish a similar purpose.

Referring generally to the preferred embodiment illustrated in FIGS. 1 through 8, and referring specifically to FIG. 1, there is shown a combined broiler top and griddle unit 10 according to the invention. Unit 10 comprises a broiler top 12, a generally horizontal, rectangular griddle assembly 14 and a plurality of elongated vertical legs 18. In the preferred embodiment, four legs of square cross-section secured to the underside of housing 20 are used, but other conventional support arrangements are contemplated.

Griddle assembly 14 comprises a griddle housing 20 and a griddle 22 mounted in housing 20. Griddle 22 includes a substantially planar metallic griddle surface 24. Griddle surface 24 preferably is constructed of one-inch-thick steel plate. In a preferred embodiment, griddle surface 24 is substantially rectangular in shape, but griddle surface 24 can also be square.

Referring to FIG. 8, in another embodiment griddle 22 is substantially longer from side to side than broiler top 12. This difference in dimension provides a griddle surface 24 which is not covered by broiler top 12 when top 12 is closed, such that griddle surface 24 can be used for griddle cooking when top 12 is closed.

Figure 2:
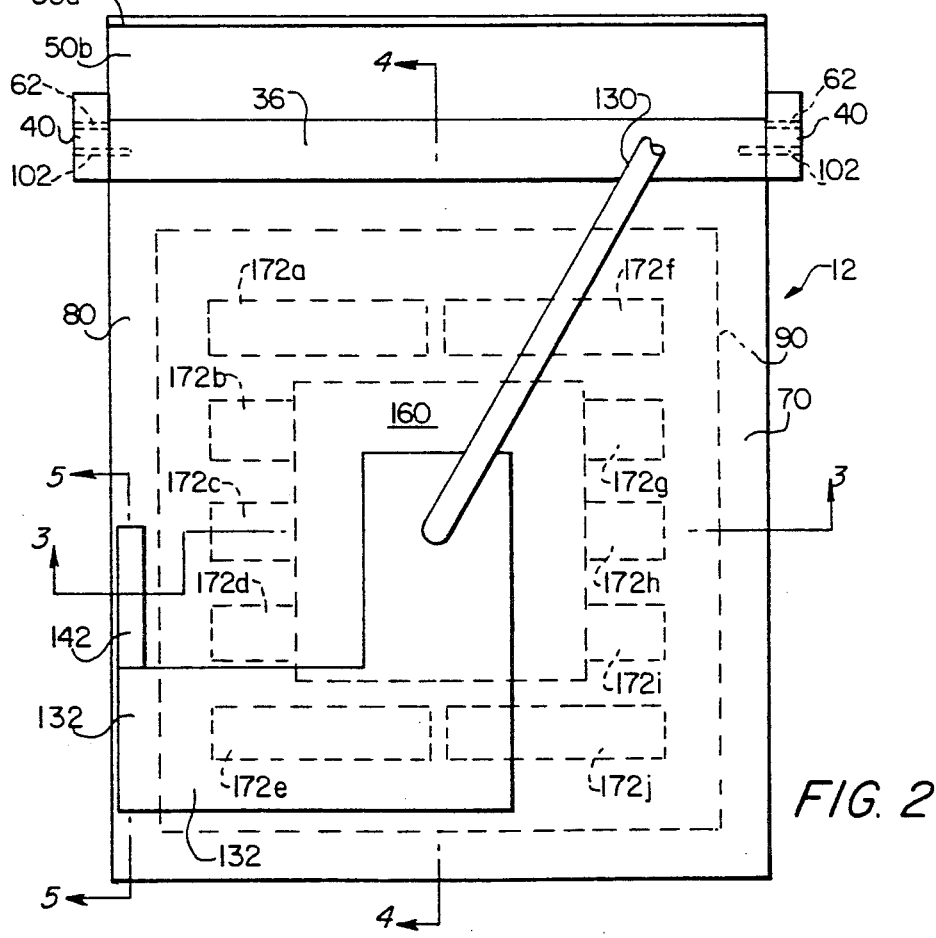
FIG. 2 is a top plan view of the broiler top.
Figure 3:
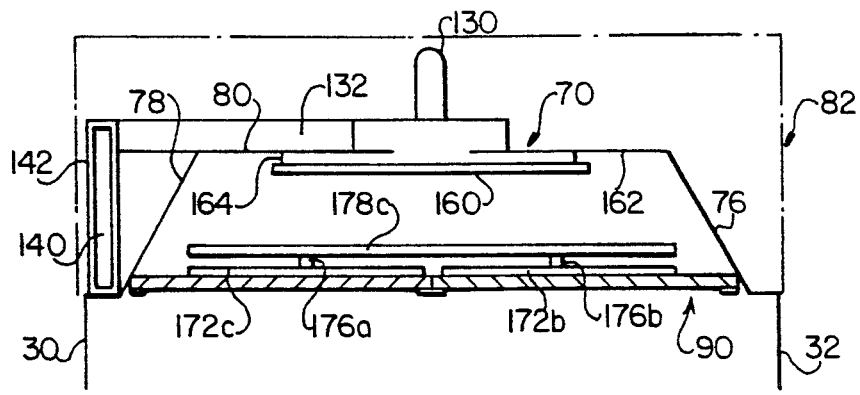
FIG. 3 is a front sectional view of the broiler top taken along line 3—3 of FIG. 2.
Figure 4:
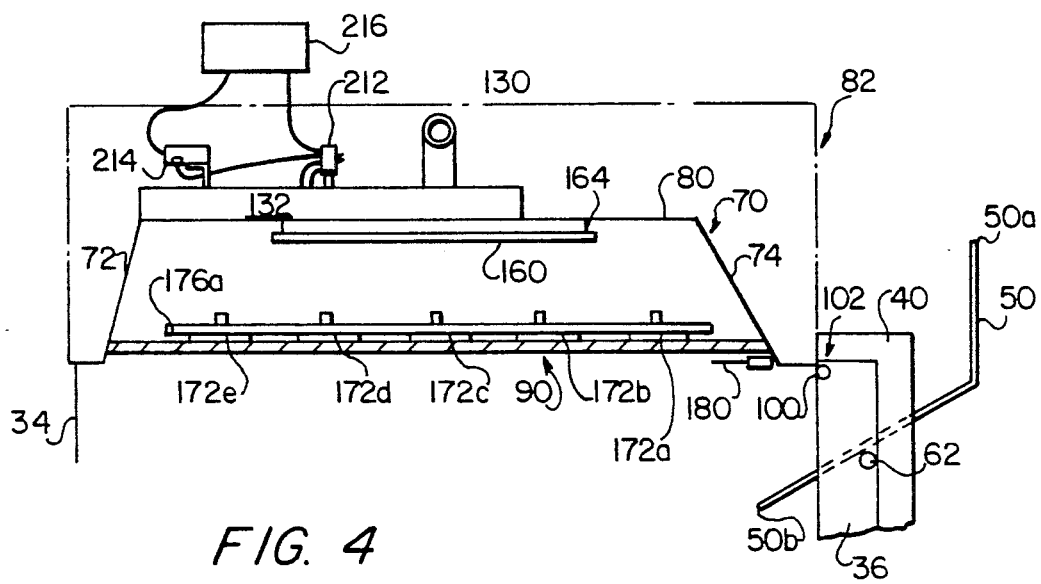
FIG. 4 is a side sectional view of the broiler top taken along line 4—4 of FIG. 2.

Referring specifically to FIGS. 1, 3 and 4, housing 20 comprises vertical left and right side curtains 30 and 32, and vertical front and rear end curtains 34 and 36, respectively. Side curtains 30 and 32 further shield and protect internal components within housing 20 from damage and human contact. As shown in FIG. 2, two support stanchions 40 are secured to the ends of curtain 36 and are secured by any conventional fastening means such as bolts. Stanchions 40, which preferably are substantially rectangular in cross-section, extend vertically above the top edges of curtains 30, 32, 34 and 36 of griddle 22 to provide a clearance space between broiler top 12 and griddle surface 24 when top 12 is closed. In the preferred embodiment, the space measures 6¼" in height.

Referring now to FIG. 4, a vent baffle 50 is secured to housing 20 at an angle with respect to stanchions 40, for the purpose of directing exhaust gases produced during cooking upward and out of the apparatus. Vent baffle 50 comprises a vertical portion 50a parallel to rear curtain 36 and an angled portion 50b forming an obtuse angle with vertical portion 50a. Preferably, baffle 50 is constructed of sheet metal. Angled portion 50b of baffle 50 is pivotally mounted on stanchions 40 using two pivot pins 62, which are preferably ¼" in diameter. Pins 62 are affixed perpendicular to stanchions 40 and protrude toward the interior of the apparatus, as shown in FIG. 2. Baffle 50 is preferably secured to rear curtain 36 using a single sheet metal screw. Vertical portion 50a is substantially rectangular in shape, having lateral dimensions equal to the width of top 12, and directs exhaust gases upward during combustion.

As depicted in FIG. 2, when viewed from overhead broiler top 12 is substantially square in shape. However, other shapes including rectangles and circles are contemplated. Referring now to FIGS. 3 and 4, broiler top 12 includes a burner box 70 having front and rear panels 72 and 74 and left and right side panels 76 and 78 which are attached to rear panel 74 and front panel 72, and a top panel 80. Top panel 80 is generally square in shape, when seen in a plan view as indicated in FIG. 2. Panels 72, 74, 76 and 78 are attached at an obtuse angle with respect to panel 80, and such that the longitudinal cross-section of burner box 70 is trapezoidal, as shown in FIGS. 3 and 4.

Referring again to FIG. 1, broiler top 12 is further provided with a housing 82 for enclosing and housing the burner box 70. Housing 82 includes top panel 83, rearward panel 84, front panel 86 and two side panels 85, as depicted in FIG. 1. The burner box 70 is supported within the housing 82 using conventional support arrangements. The housing 82 does not include a bottom panel, such that burner surface 90 of burner box 70 protrudes through the bottom of housing 82.

Broiler top 12 is provided with a handle 79 secured to front panel 86 of housing 82.

An infrared burner surface 90, depicted in phantom lines in FIG. 2, is secured to panels 72, 74, 76 and 78 and forms the underside of broiler top 12; burner surface 90 is substantially square in shape when viewed from above, as shown in FIG. 2. Burner surface 90 includes a plurality of burner ports (not shown) of conventional construction distributed across burner surface 90.

In the preferred embodiment, broiler top 12 is hingedly attached to stanchions 40 using a hinge pin and sleeve bearing assembly 102. The pin is preferably constructed of iron pipe ⅜" in diameter, the two ends of which are affixed (preferably tack welded) to stanchions 40. The sleeve bearing is welded to curtain 36. However, other embodiments may be constructed using a plurality of hinges or other hinging means.

The hinged broiler top 12 is retained in the raised position using a spring/rod assembly (not shown) of known design.

Referring to FIG. 2, a griddle gas supply pipe 130 is attached diagonally across top panel 80 of burner box 70 and is joined to the center of burner box 70 through an air duct 132. Supply pipe 130 terminates in a connector of conventional design (not shown) at rearward panel 84 of housing 82. Panel 84 is provided with an aperture therein (also not shown) to permit access to the connector from the exterior of housing 20. Gas is supplied to pipe 130 at conventional pressure from an external residential or commercial gas line. Duct 132 is substantially L-shaped when seen in a plan view, as indicated by FIG. 2, and duct 132 extends from the center of burner box 70 to its left side where duct 132 is connected to a blower 140. In a preferred embodiment, duct 132 is formed of sheet metal.

Figure 5:
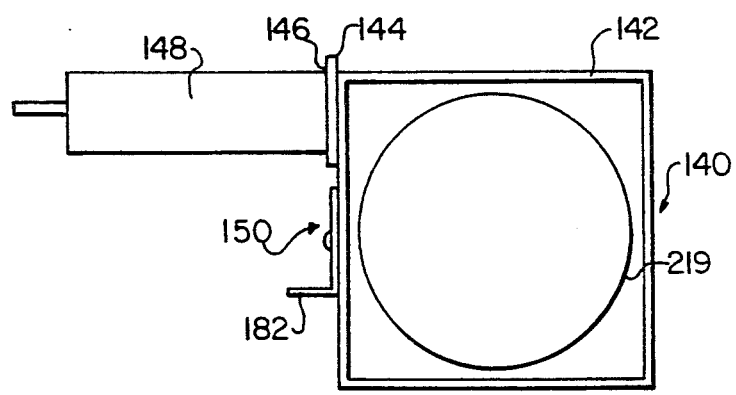
FIG. 5 is a partial side sectional view of the combustion air distribution equipment of the broiler top taken along line 5—5 of FIG. 2.

Referring to FIG. 5, blower 140 is of conventional design and is incorporated in a compact housing 142; in a preferred embodiment, housing 142 is 4¾" in length and width and is 1½" deep. The compact size of housing 142 enables it and blower 140 to fit within the confined space of broiler top 12. Blower 140 includes an outlet flange 144 which is secured to an inlet flange 146 of a duct 148 using a single sheet metal screw. Blower 140 further includes an entrance 150 and intake air shutter 182. A pressure switch 212 is positioned in the path of the airflow output of blower 140, for a purpose to be described hereinafter. Blower 140 is further secured within top 12 using insulation material (not shown) packed tightly around blower 140. Duct 148 is secured to side 76 of burner box 70, by conventional means such as a plurality of sheet metal screws.

The interior of burner box 70 is provided with a spreader baffle 160, mounted immediately below top panel 80 burner box 70, as shown in FIGS. 3 and 4. In the preferred embodiment, baffle 160 is separated from the interior surface 162 of panel 80 by approximately ¼" of air space. Baffle 160 is preferably constructed of 18-gauge corrosion-resistant steel, and is preferably secured to interior surface 162 of panel 80 using a plurality of fasteners 164. Each fastener 164 is mounted at a corner of baffle 160, and fasteners 164 are preferably comprised of a sheet metal screw and a ¼" spacer (not shown). Baffle 160 is square in shape, when seen in a plan view as indicated in phantom in FIG. 1, and preferably has side dimensions of 8".

A plurality of burner baffles 172a through 172j are secured to the interior surface of burner surface 90. As shown in FIG. 2, ten rectangular burner baffles 172a through 172j are provided. The baffles 172a through 172j are incorporated in a burner baffle assembly 174 depicted in FIG. 7. Assembly 174 comprises two frame members such as parallel, spaced-apart bars 176a and 176b having forward ends 180 and rearward ends 182 affixed respectively to front panel 72 and rear panel 74. In the preferred embodiment, members 176a and 176b are metal bars having a U-shaped cross-section. Bars 176a and 176b are joined by a plurality of cross bars 190. As shown in FIG. 7, there are preferably five cross bars 190a through 190e. Bars 190a-190e are each mounted perpendicularly on members 176a and 176b. Bars 190a through 190e are preferably 12¾" long, 1½" wide, and are constructed of metal bar having U-shaped cross-section. Baffles 172a through 172j are secured in two parallel, spaced-apart rows directly to parallel, spaced-apart bars 176a and 176b, each row of baffles 172a through 172e and 172f through 172j being centered respectively over bars 176a and 176b. Baffles 172a through 172j are further secured in pairs 172a and 172f, 172b and 172g, 172c and 172h, 172d and 172i, and 172e and 172j to bars 178a through 178e, respectively, each pair being centered over its respective bar.

In the preferred embodiment, each baffle 172a through 172j is 6" long and 1½" wide, separation space 217 is 1¼" and space 218 is 1½". Thus baffles 172a through 172j cumulatively provide a total of 90 square inches of burner surface area.

Referring now to FIG. 4, broiler top 12 is provided with a ceramic element 180, which element 180 functions both as a hot surface ignitor when energized at 24 volts AC, and as a flame sensor when de-energized. Element 180 is secured to the lower edge of panel 74 of box 70.

In the preferred embodiment, mechanical operation of broiler top 12 proceeds as follows. Combustion air is drawn from the ambient atmosphere by blower 140 through air inlet 219. A variable amount of air is propelled through air duct 148 by bower 140 and opening or closing of bypassing shutter 182. Gas is supplied at line pressure through gas line 130 into the air prior to entering burner box 70. The air/gas mixture is distributed throughout burner box 70 by spreader baffle 160. The air/gas mixture exits ports in infrared burner 90 and ignites on the surface. Initial ignition energy and flame-sensing are both provided by a ceramic element 180. The plurality of burner baffles 172a through 172j maintain desired average burner port loading at the required input rate over the required overall dimensions. Side curtains 30 and 32 help channel the flue products or exhaust to vent baffle 50 at the rear and help to maintain an acceptable air temperature at the blower entrance 150. Curtains 30, 32, and 34 provide three additional functions: (1) to retain heat within and under boiler top 10 to increase parameter surface temperatures, therefore improving temperature distribution; (2) to keep heat away from the blower inlet; and (3) to minimize grease splatter to the operator and surrounding area.

In the preferred embodiment, electrical operation proceeds as follows, as schematically illustrated in FIG. 6. Line voltage of 120 volts AC is applied at L1, L2 and G (ground). Whenever main power switch 210 is closed, line voltage is supplied to combustion air blower 140 which consequently operates Air pressure caused by the airflow output of combustion air blower 140 closes pressure switch 212. A position switch 214 is connected in series with pressure switch 212, which in turn is connected in series to an ignition control module 216. When top 12 is lowered, position switch 214 closes in response to contact with top 12, activating ignition control module 216. Module 216 then energizes ceramic element 180. When element 180 attains ignition temperature, which ordinarily occurs after 2 to 4 seconds, a gas solenoid valve 222 opens, supplying gas to the energized ignitor. Position switch 214 is responsive to the position of broiler top 12; switch 214 closes when top 12 is in the lowered or closed position, and switch 214 opens when top 12 is raised. As long as position switch 214 is closed and ceramic element 180 indicates that the gas is burning, gas valve 222 will remain open. Conversely, when top is raised, position switch 214 opens, causing gas valve 222 to close, thereby interrupting the flow of gas and exhausting the flame.

A step-down transformer 220 is provided and reduces the line voltage to 24 volts AC for powering ignition module 216.

Many modifications and variations of the present invention are possible in light of the above teachings and specification. It is therefore to be understood that, within the scope of the appended claims, the invention may be practiced otherwise than as specifically described.

What is claimed is:

1. A combination cooking apparatus for preparing food, comprising:
    gas-fired griddle means including a top cooking surface for cooking food by direct contact between said cooking surface and the food, said top cooking surface being selectively actuable between a heated condition in which a flame is present and an unheated condition;
    gas-fired brioler means including a broiler overhead heat source for cooking food by indirect exposure to said broiler overhead heat source, said broiler overhead heat source being selectively actuable between a heated and an unheated condition;
    broiler movement means for selectively moving said broiler means between a closed position over and in close proximity to said top cooking surface of said griddle means and an open position distinct from said top cooking surface of said griddle means; and
    control means for automatically activating only said broiler overhead heat source in response to said broiler means being moved into said closed position and for automatically deactivating only said broiler overhead heat source in response to said broiler means being moved into said open position.

2. The apparatus of claim 1, said griddle means comprising:
    heating means for heating said cooking surface and
    a griddle housing for housing said cooking surface and said heating means.

3. The apparatus of claim 1, said overhead heat source comprising an infrared burner surface.

4. The apparatus of claim 3, said broiler means further comprising:
    a burner box positioned over said burner surface, said burner box having opposed front and rear walls, a pair of opposed side walls, a top, and an interior defined by said front, rear, and side walls and said burner surface;

supply means for supplying a combustible gas to said interior of said burner box; and exhaust means for exhausting combustion products from said interior of said burner box.

5. The apparatus of claim 4, further comprising ignition and flame sensing means actuable between an energized condition for igniting the gas in said burner box to produce a flame in said broiler overhead heat source and a deenergized condition for sensing a flame in said broiler overhead heat source.

6. The apparatus of claim 4, said broiler means further comprising:

a spreader baffle positioned in said interior of said burner box below and parallel to said top wall of said burner box, said spreader baffle being separated from said top wall by an air space and a plurality of burner baffles positioned in said interior of said burner box on said burner surface.

7. The apparatus of claim 6, said burner baffles being arranged in parallel to each other in parallel rows.

8. The apparatus of claim 4, said exhaust means comprising:

an air duct in fluid communication with said interior of said burner box and blower means for drawing combustion products through said air duct.

9. A combination cooking apparatus for preparing food, comprising:

gas-fired griddle means including atop cooking surface for cooking food by direct contact between said cooking surface and the food, said top cooking surface being selectively actuable between a heated condition in which a flame is present and an unheated condition;

gas-fired broiler means including a broiler overhead heat source for cooking food by indirect exposure to said broiler overhead heat source, said broiler means being selectively movable between a closed position over and in close proximity to said top cooking surface of said griddle means and an open position away from said top cooking surface of said griddle means, and said broiler overhead heat source being selectively actuable between a heated and an unheated condition;

control means for automatically activating only said broiler overhead heat source in response to said broiler means being moved into said closed position and for automatically deactivating only said broiler overhead heat source in response to said broiler means being moved into said open position;

supply means for supplying a combustible gas to said broiler means;

exhaust means for exhausting combustion products from said boiler means;

ignition and flame sensing means actuable between an energized condition for igniting the gas in said broiler means to produce a flame in said broiler overhead heat source and a de-energized condition for sensing a flame in said broiler overhead heat source;

a pressure-responsive switch actuable between closed and open positions in response to air flow output of said exhaust means;

a position-responsive switch actuable between closed and open positions in response to the position of said broiler means;

ignition control means actuable between an energizing and a de-energizing condition and responsive to the positions of said pressure-responsive switch and said position-responsive switch for energizing and de-energizing said ignition and flame sensing means in response to the positions of said pressure-responsive and position-responsive switches; and temperature-responsive gas valve means responsive to the temperature of said ignition and flame sensing means for regulating the flow of gas from said supply means.

* * * * *